(12) United States Patent
Burr et al.

(10) Patent No.: US 7,180,503 B2
(45) Date of Patent: Feb. 20, 2007

(54) INDUCTIVE POWER SOURCE FOR PERIPHERAL DEVICES

(75) Inventors: Jeremy Burr, Portland, OR (US); Rajgopal Ramamoorthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 10/006,171

(22) Filed: Dec. 4, 2001

(65) Prior Publication Data

US 2003/0103039 A1    Jun. 5, 2003

(51) Int. Cl.
*G09G 5/08* (2006.01)
*H02J 7/00* (2006.01)
*H01F 17/00* (2006.01)
*G06F 1/00* (2006.01)

(52) U.S. Cl. ............... 345/163; 345/179; 320/108; 320/114; 323/355; 713/300

(58) Field of Classification Search ........ 345/156–157, 345/163–166, 168, 173, 179; 323/355–363, 323/371; 713/300, 310, 320; 320/108, 114
See application file for complete search history.

(56) References Cited

U.S. PATENT DOCUMENTS

| | | | | |
|---|---|---|---|---|
| 4,031,449 A | * | 6/1977 | Trombly | 320/108 |
| 4,754,268 A | * | 6/1988 | Mori | 345/163 |
| 5,420,379 A | * | 5/1995 | Zank et al. | 178/19.03 |
| 5,428,521 A | * | 6/1995 | Kigawa et al. | 363/22 |
| 5,959,433 A | * | 9/1999 | Rohde | 320/108 |
| 2002/0036621 A1 | * | 3/2002 | Liu et al. | 345/173 |
| 2003/0048254 A1 | * | 3/2003 | Huang | 345/163 |

FOREIGN PATENT DOCUMENTS

| | | | |
|---|---|---|---|
| DE | 299 22 632 U1 | * | 10/2000 |
| GB | 2094574 A | * | 9/1982 |
| GB | 2314470 A | * | 12/1997 |
| JP | 11095922 A | * | 4/1999 |
| JP | 2001159948 A | * | 6/2001 |

* cited by examiner

*Primary Examiner*—Henry N. Tran
(74) *Attorney, Agent, or Firm*—Marger Johnson & McCollom, PC

(57) ABSTRACT

A system for providing power to a computer peripheral device during the normal operation of the device is disclosed. A base is provided that includes a winding of a coil. The winding is driven to make a constantly changing magnetic field. The peripheral device also includes a winding of a coil. When the winding of the coil is placed in the changing magnetic field, a voltage is induced in the winding. That voltage can be converted into power for use by the peripheral device. In one embodiment the peripheral device is a mouse. The peripheral device may include a rechargeable battery, and the induced power could be used by a circuit to recharge the battery.

29 Claims, 8 Drawing Sheets

INDUCTIVE POWER SOURCE FOR PERIPHERAL DEVICES

TECHNICAL FIELD

This disclosure relates to inductively providing a power source to peripheral devices, and, more particularly, to a system for inductively providing power to peripheral devices during the normal use of the peripheral device.

BACKGROUND

Devices peripheral to personal computers are used for a variety of input or output purposes. Computer input devices include keyboards, mice, drawing tablets, cameras, etc., while computer output devices include speakers, printers, monitors, etc. Almost without exception, peripheral devices require a power source for proper operation. Oftentimes the power source comes from a standard cable coupling the peripheral device to the computer, such as connection cables for using Universal Serial Bus (USB, developed by the USB Implementers Forum, Inc.), PS/2 (International Business Machine's Personal System 2), RS232 (now renamed to EIA232 of the Electronic Industries Association), FireWire (Institute of Electrical and Electronics Engineers, Inc.'s 1394–1995 standard), etc. These cables typically provide a 5-volt dc voltage at a given current capacity to drive the device. Computer mice, for example, are typically powered at ~500 mA, to power the various internal circuits within them that track their movement and communicate the status of their mechanical buttons to their host computer.

Because a mouse cord can be cumbersome and unwieldy, there is a consumer demand for cordless mice. Thus, a new generation of mice have been developed that communicate their signals to their host computer via "wireless" signals, such as infrared (IR), radio frequency (RF), or ultrasonic signals. These wireless mice generally contain their own power source, because including a cord only to supply power to the mouse defeats the purpose of making the signal communication wireless.

The typical solution to self-powering a mouse is to include batteries within the mouse itself. Normally, high-energy batteries such as alkaline batteries are used so that they can provide power for a relatively long time between battery changes. In order to reduce overall power consumption, power saving features are implemented into wireless mice to extend the life of the batteries. For example many wireless mice will automatically "power down" their circuitry after a period of inactivity. Such power savings features can allow wireless mice to operate for months before requiring new batteries.

As new features are added to mice, such as adding a wheel for easy document scrolling, their circuitry becomes more complex. Complex circuitry, in turn, generally requires higher power requirements. These power requirements include not only how much power is needed over time, i.e., how long can a user go before the batteries cannot power any of the mouse circuitry, but also include a peak power requirement, i.e., how much instantaneous power is required to supply a specific circuit in the mouse. Particular circuits such as optical mouse tracking or radio module operations may require relatively high peak energy from the batteries for proper operation.

Although rechargeable batteries generate less power than alkaline batteries, they can be recharged hundreds or thousands of times, and thus provide power at a relatively low lifetime cost. Some computer peripheral products include a "docking cradle" or other place to rest the product during periods of non-operation, and some of the docking cradles include a battery re-charger to automatically recharge batteries in the device while it is in its docking cradle. This is typically done by exposing small electrodes within the docking cradle that transfer power to a matching set of electrodes on the device. Within the device, a circuit transfers the power that is applied to the electrodes directly to the batteries, thereby recharging them.

Requiring a device to be placed in a docking cradle to recharge its batteries means that it cannot be used while recharging. Also, if a user forgets to recharge the batteries for a period of time and they discharge, the user cannot operate the device until the batteries are again recharged. Most likely a user will discover that the batteries are discharged at a time the device is needed. Adding small wires that could recharge the batteries during device operation would defeat the purpose of having a wireless device.

Embodiments of the invention address these and other deficiencies in the prior art.

BRIEF DESCRIPTION OF THE DRAWINGS

The description may be best understood by reading the disclosure with reference to the drawings, wherein.

DETAILED DESCRIPTION

Embodiments of the invention include a base and peripheral device combination that can inductively provide power to a peripheral device. The power supplied to the peripheral device could drive the device directly, or could be used to charge an energy supply, such as batteries contained within the device. An example of such a system is a mousepad base and a mouse containing rechargeable batteries.

Coils or loops of wire are present in both the mousepad and in the mouse. The coils in the mousepad are energized to create a constantly changing magnetic field. When the coils in the mouse are exposed to the changing magnetic field made by the mousepad, an induced voltage and a current flows in the coils of the mouse. The induced current and voltage provide enough energy to partially or completely recharge batteries in the mouse and, as power requirements of the mouse decrease, may be able to provide enough energy to power the mouse directly without using the power reserve of the batteries.

Figure 1:
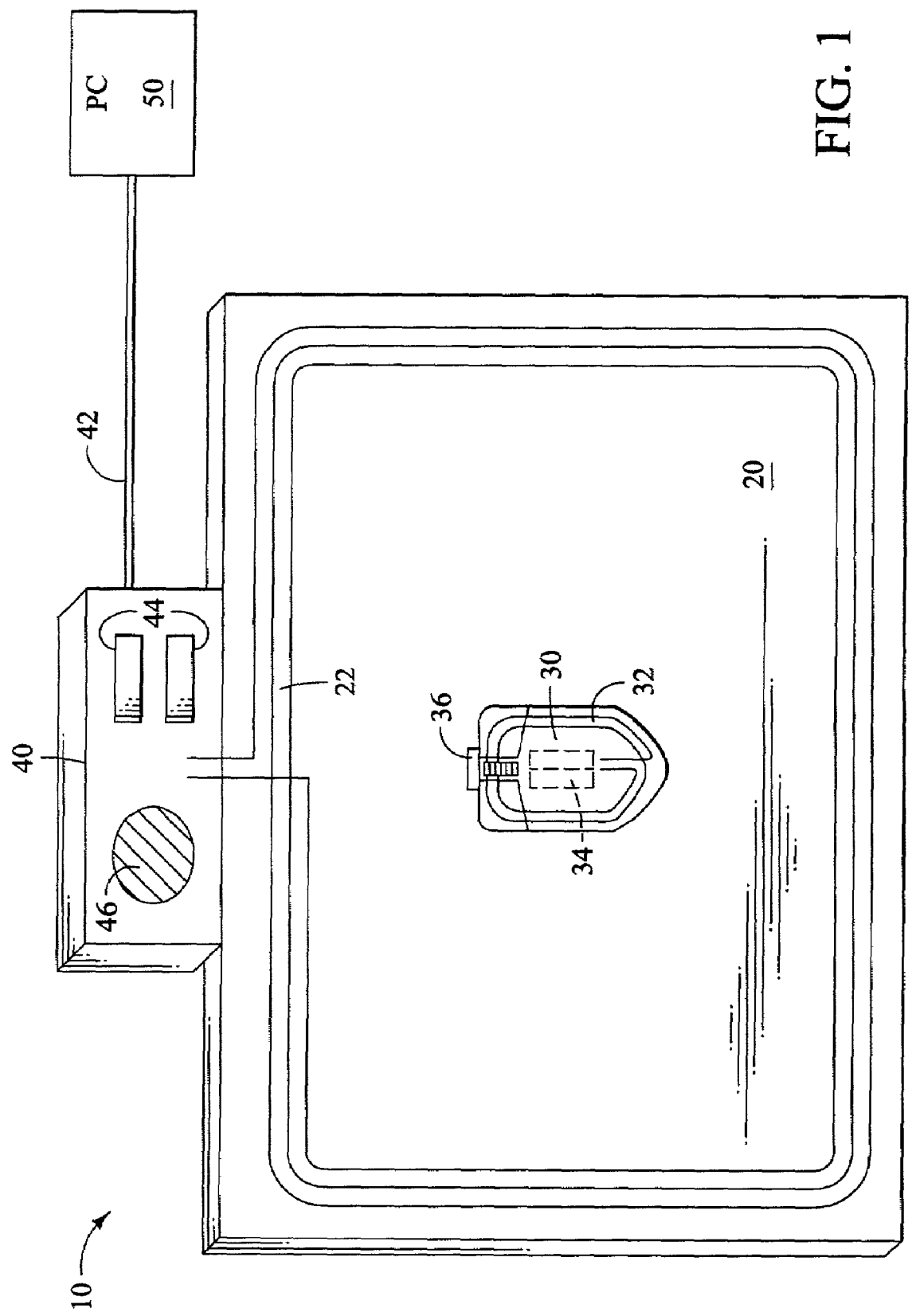
FIG. 1 is a perspective view of an inductive power supply system according to an embodiment of the invention.

FIG. 1 is a perspective view of an inductive re-charger system 10, which includes a mousepad 20 and a mouse 30, according to an embodiment of the invention. The mousepad 20 includes a source loop 22, and the mouse 30 includes a victim loop 32. Both of the loops 22, 32 are internal to their respective housings, and are hidden from view in a standard embodiment. Additionally hidden from view in the standard embodiment are one or more rechargeable batteries 34 in the mouse 30, which are used to power various circuits in the mouse. Briefly, in operation, a current is forced to flow through the source loop 22 of the mousepad 20, which causes current to flow in the victim loop 32 of the mouse 30 by magnetic induction. This current flow, in turn, is used to recharge the batteries 34 of the mouse.

In addition to the mousepad 20 and the mouse 30, the embodiment shown to in FIG. 1 also includes a control housing 40. A cable 42, for example a USB cable, couples the control housing 40 to an attached personal computer (PC) 50. In the embodiment where the cable 42 is a USB cable, the control housing may be a USB hub, and include multiple input ports 44 for other devices to connect to the USB bus. As an example, a keyboard may also connect to the USB hub 40. The cable 42 provides a power source through the control housing 40 to the mousepad 20 in order to energize the source loop 22. In this embodiment, the control housing 40 also includes a data receiver 46, such as an IR receiver. The data receiver 46 receives signals from a data transmitter 36 on the mouse 30, such as an IR transmitter, and transmits the received mouse signals (or other signals based on the IR signals received from the mouse IR transmitter) over the USB cable 42 to the computer 50. In this way, the data transmitter 36 on the mouse 30 need only transmit the data signals a very short distance to the data receiver 46 on the control housing 40, and not the entire distance to the computer 50. This allows the data transmitter 36 on the mouse 30 to operate with less power than would be needed to transmit the signals from the mouse directly to the computer 50. In other embodiments, of course, the data receiver 46 can be located on the PC 50 or anywhere else that allows good signal capturing from the mouse transmitter 36.

The power source coming through the cable 42 can be either a DC voltage or an AC voltage. If the cable 42 is a USB cable, then the voltage on the cable is 5 Volts DC, according to the USB standard. The cable 42 could be delivering any type of voltage, but in order to make the constantly changing magnetic field to induce a current flow in the victim loop 32, an alternating current must be supplied to the source loop 22, as discussed below with reference to FIG. 4.

The source loop 22 is formed by one long wire shaped into a spiral coil. The source loop 22 formed in this shape is called a solenoid, and when electric current flows through the source loop, lines of magnetic flux are created within the solenoid. The amount of magnetic flux generated by the source loop 22 is related to a number of factors. A first factor is the amount of current flowing through the source loop 22. Also, the magnetic flux is proportional to the number of turns per unit length of the wire making up the coils in the source loop 22. Additionally, the amount of flux is also based on a magnetic permeability of the material in which the magnetic flux is flowing. Once the overall mechanism for inductively providing power to the mouse 30 has been explained, increasing the effectiveness of the system by maximizing these factors will be examined.

Generally, in operation, the source loop 22 is powered with an alternating current, which creates constantly changing magnetic flux lines (indicating a magnetic field) in the area above and below the mousepad 20. When the mouse is located within the changing magnetic flux lines, a voltage is induced in the victim loop 32. This voltage is fed to a transforming circuit (not shown in FIG. 1) that transforms it into a voltage for use by the mouse 30, such as for charging the batteries 34 in the mouse 30.

Figure 2:
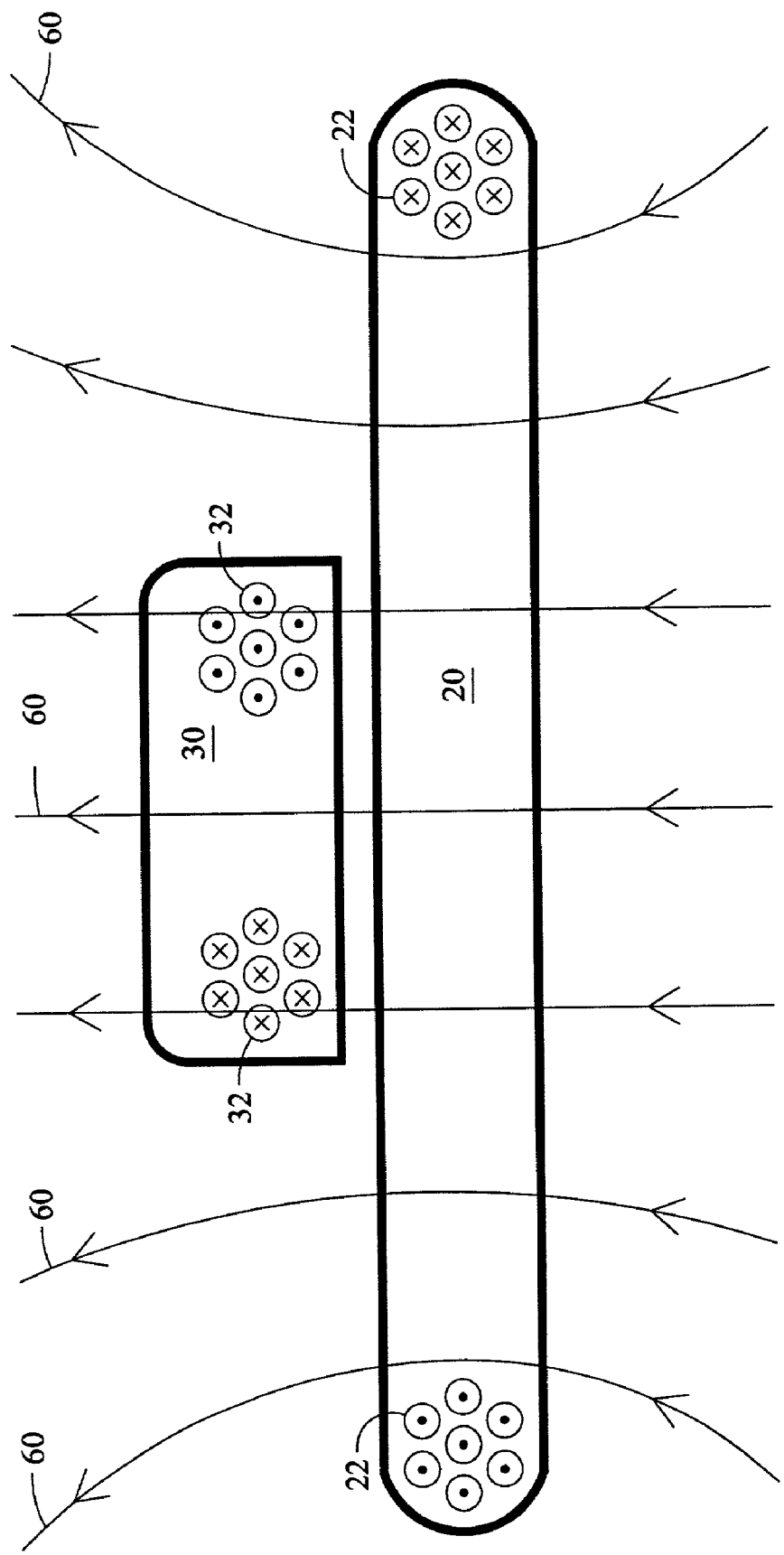
FIG. 2 is a cross sectional view of a mouse and mousepad containing an inductive charging system according to an embodiment of the invention.

FIG. 2 is a cross sectional view of the mouse 30 sitting on the mousepad 20. The source loop 22 and the victim loop 32 can be seen in the cross section. Although in FIG. 2 it appears that there are multiple separate wires in each of the loops 22, 32, the source loop 22 and the victim loop 32 are each made from only 1 strand of wire. When current is applied to the source loop 22, lines of magnetic flux 60 are created inside the coils of wire. As can be seen, the flux lines 60 near the center of the source loop 22 are fairly straight, while those near the edges of the source loop are curved around to the outside of the loop. All of the flux lines from the source loop eventually curve back around the outside of the coil to join with the flux lines extending from the bottom of the mousepad 20, and make a closed loop. For this description, only the portions of the flux lines that are near the mousepad 20 are important for consideration as to their effect on the victim loop 32, because they are the only ones that will interact with the mouse 30 in its normal position resting on the mouspad.

In addition to their unusual shape, the magnetic flux lines 60 have other unusual properties. Because the magnetic flux lines 60 repel one another, the flux lines tend to spread out evenly across the inside of the source loop 22. This is called having a constant flux density across the source loop 22.

Because the mouse 30 is typically much smaller than the mousepad 20, when the mouse is placed on top of the mousepad, much of the magnetic flux lines 60 do not travel through the victim loop 32. Therefore, many of the magnetic flux lines 60 contribute nothing to inducing a voltage in the victim loop, and are simply wasted.

When the mouse 30 is placed within the constantly changing lines of magnetic flux 60, a voltage and current is induced in the victim loop 32 of the mouse. Increasing the amount of magnetic flux 60 also increases the amount of voltage induced in the victim loop 32, so it is advantageous to increase the magnetic flux as much as possible. As mentioned above, two ways to increase the amount of magnetic flux are to increase the current flowing through the source loop 20 and the number of turns per unit length in the source loop.

Figure 3:
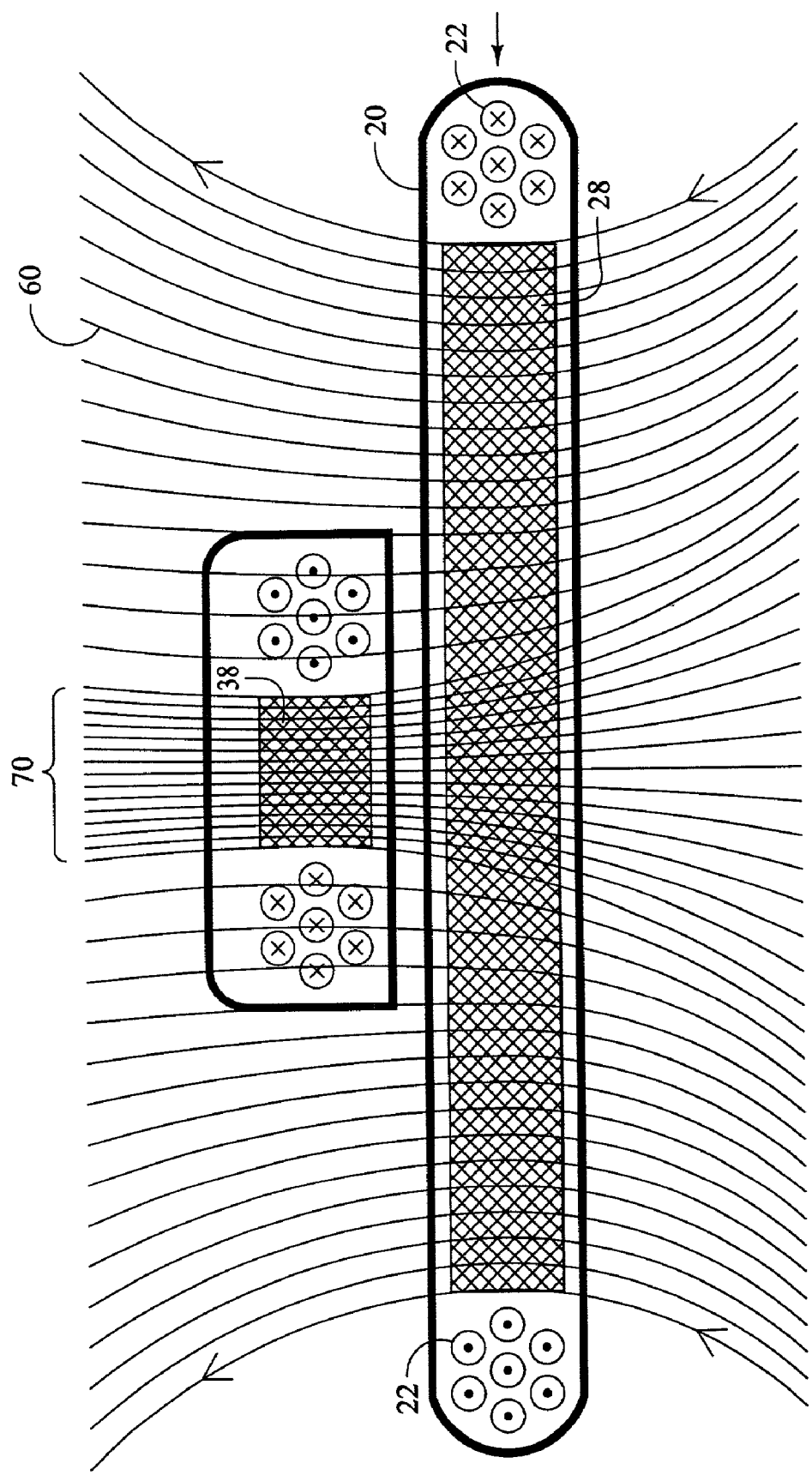
FIG. 3 is a cross sectional view of a mouse and mousepad containing an inductive charging system according to another embodiment of the invention.

Another way to increase the density of the magnetic flux 60 is for the flux to flow through a material having a relatively high magnetic permeability. FIG. 3 shows an embodiment of the invention where both the mousepad 20 and the mouse 30 are formed with areas having a high level of magnetic permeability. The high permeability area of the mousepad 20 is indicated with the reference 28, while the high permeability area of the mouse 30 is indicated with the reference 38. Examples of materials having a high magnetic permeability are iron or iron filings, steel, nickel, and cobalt, or combinations of these materials, as well as some more exotic compounds such as silicon iron, and others. These materials can be combined with substrates, such as plastic or foam, or binders such as epoxy to create a material that has high magnetic permeability yet remains easy to work with for manufacturing. As seen in FIG. 3, because the magnetic flux lines 60 can pass through the areas of high level magnetic permeability more easily than they can in the other areas, high density flux lines 70 are present in these areas. Although in this figure both the mousepad 20 and the mouse 30 include the high areas of permeability 28, 38, embodiments of the invention are still operational if, both, or neither the mouspad nor mouse include such areas. If the mouse 30 includes the high areas of permeability 38, then when the mouse is operating normally on top of the mousepad 20, the high density flux lines 70 will move with the mouse and allow more energy transfer from the mousepad than if the high areas of permeability 38 were not included in the mouse.

In addition to being permeable to the magnetic flux, the high areas of permeability 38 may also have properties that make a good transmitter antenna. Therefore, they may also be formed in conjunction with the data transmitter 36 on the mouse 30 to enhance the transmitter's ability to send the data signals to the receiver.

Figure 4:
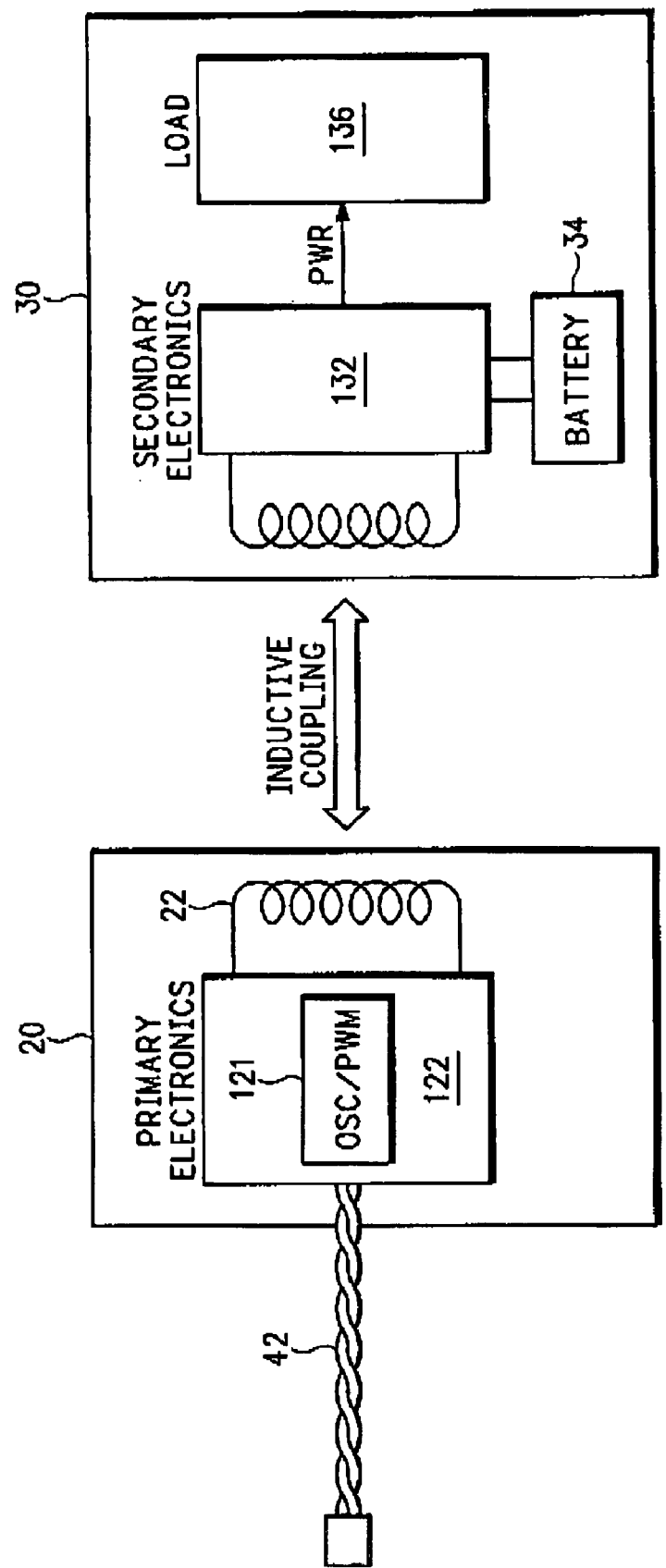
FIG. 4 is a functional block diagram showing connections and circuit blocks used in the inductive charging system according to embodiments of the invention.

FIG. 4 is a functional block diagram showing connections and circuit blocks used in the inductive charging system. As before, the cable 42 provides power to the mousepad 20. The cable 42 may be directly attached to the mousepad 20, or may be intermediately connected to the control housing 40 (FIG. 1). The power from the cable 42 is supplied to a primary side power circuit 122, which also has an output to drive the source loop 22. The primary power circuit 122 includes whatever circuitry is necessary to convert the voltage and current provided by the cable 42 into a signal that will provide a constantly changing current for the source loop 22. For example, if the input voltage is a direct current (DC) voltage, the primary power circuit 122 includes a circuit to produce a changing signal, such as an oscillation circuit 121. An example of such a circuit is a Pulse Width Modulation (PWM) circuit, which can supply the source loop with a constantly changing voltage and current while having a dc voltage as an input. Other oscillating circuits perform similar functions that can be used in place of the PWM circuit. Additionally, the primary power circuit 122 may include voltage matching circuitry, if necessary, to match the voltage supplied to it by the cable 42 with the voltage that is supplied to the source loop 22. For instance, the cable 42 may supply a 120 Volt alternating current (AC) signal. Although the AC portion of that incoming signal may not need to be rectified, it is likely that the 120 volts would be reduced to a lower voltage by the voltage matching circuitry included in the primary power circuit 122.

An additional factor in inductively transferring a voltage is the frequency at which the magnetic flux lines 60 change. So far, the previous factors discussed only how to make more magnetic flux lines 60 (higher current, more windings, higher permeable materials, etc). An additional consideration in inducing a voltage in two close coils is how fast the magnetic flux lines 60 change. Therefore, the primary power circuit 122 may also include circuitry able to drive the source loop 22 with a rapidly changing (i.e. high frequency) alternating current. A high frequency driver may be included in the primary power circuit 122 even if the cable 42 is carrying an AC signal, if the current is not switching at a high enough frequency for good induction.

Included in the mouse 30 is a secondary power circuit 132, which is used to convert the signal received from the victim loop 32 into one useful to the mouse 30, e.g., to recharge the rechargeable batteries 34. There are fewer variables in designing the secondary power circuit 132 than the primary power circuit 122, because it is known that the source signal coming from the victim loop has an AC voltage. Therefore, if the batteries 34 will be charged with a DC voltage, the secondary power circuit 132 includes an AC to DC converter. A simple converter can be formed of diodes, such as a bridge rectifier, or other more complex circuits could be used. Newer technology in recharging batteries reveals that charging batteries with pulses of current or voltage may have advantages over charging them by traditional constant voltage methods, in terms of reducing memory effects and increasing longevity of the batteries. Therefore, the secondary power circuit 132 may include a pulse charging circuit between the victim loop 32 and the batteries 34.

Load circuitry 136 is also coupled to the battery 34, the secondary power circuit 132, or both of them. Such load circuitry 136 includes the circuits necessary to create the signals transferred back to the PC 50 (FIG. 1), for instance, the X-Y locating circuitry, the circuits to detect the button clicks or mouse wheel rotation, and/or including the transmitter 36 used to transmit the data signals from the mouse 30 to the receiver 46.

The load circuitry 136 of the mouse 30 may require a peak current draw of about 50 mA, or some other number. This peak current need may exceed the instantaneous capacity of the effective current of the signal from the source loop 32. This is acceptable, because there will often be times when the mouse 30 uses no power, for instance at times when the user is not operating the mouse and it has shut down. During these non-operational times, if there is still a power connection via the cable 42, the mouse 30 will continue to charge its rechargeable batteries 34. If, for instance the useable current from the secondary power circuit 132 is about 5 mA, there must be adequate time to charge the batteries 34 to ensure there is enough stored power to drive the load circuitry 136. Provided the source loop 32 is energized for long periods of time while the mouse is being unused, then the average power output by the secondary power circuit 132 should be more than the average power requirements of the mouse 30, in normal operation.

As power requirements for the load circuitry 136 in a mouse 30 are reduced by new methods and standards, it may be that the induced signal from the victim loop 32 is able to completely power the load circuitry 136. If this were always the case, then the batteries 34 could be eliminated from the mouse 30, or, in alternative embodiments, the secondary power circuit 132 could choose to power the load circuitry from either the signal received from the victim loop 32, the batteries 34, or a combination of both of them. For example, if the signal from the victim loop 32 was 10 mA, and the load circuitry 136 required only 6 mA, then the secondary power circuit 132 could supply the first 6 mA to the load circuitry 136 and route the remaining 4 mA to recharge the batteries 34. As mentioned above, if the signal generated by the victim loop 32 is always greater than the highest instantaneous power requirements of the load circuitry 136, then the batteries 34 could be eliminated from the mouse 30 entirely.

If the mouse 30 does include batteries 34, then once the batteries have reached an acceptable level of recharging, the mouse may be removed from the area near the source loop 22, and the mouse will continue to work, using its stored charge in the batteries to supply power to the mouse. When the batteries discharge, either from use or simply from slowly discharging themselves over time, the mouse 30 will need to be returned to the mousepad 20 for recharging.

Figure 5:
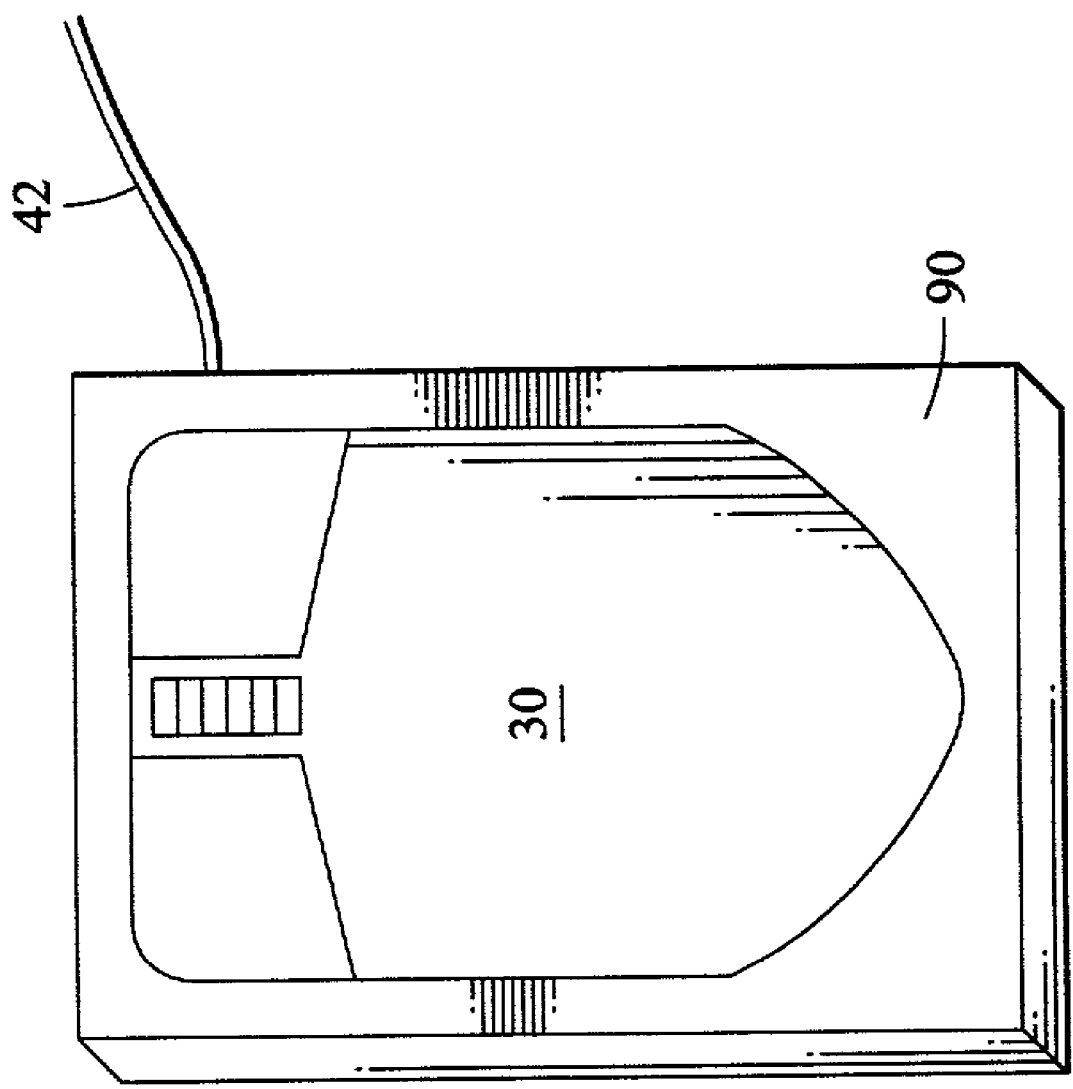
FIG. 5 is a perspective view of a docking cradle adapted to include an inductive charging system according to an embodiment of the invention.

Nothing prevents embodiments of the invention from being used in conjunction with a docking cradle that is also able to recharge the batteries 34 of the mouse. Such a system is shown in FIG. 5, which shows a docking cradle 90 shaped to accept the mouse 30 within it. The docking cradle 90 may also have a source loop 22 (not shown because internal) and is able to inductively provide power to the mouse 30, or it may have conventional charging electrodes. In the latter case, the mouse 30 would include a matching set of electrodes connected to a circuit that recharges the batteries 34 of the mouse. In either case, the docking cradle 90 would have to be able to provide more power to the mouse than the mousepad 20; otherwise the user would simply choose to power the mouse during normal use with the mousepad, because it is more convenient. If the source loop 22 within the docking cradle 90 created the same overall magnetic flux 60 as the source loop 22 in the mousepad 20, then the docking cradle 90 would transfer more power to the mouse than the mousepad because more magnetic flux would contact the victim loop 32 in the mouse 30. This is because presumably the docking cradle 90 would be shaped to exactly match the size of the victim loop 32 of the mouse 30, and none of the magnetic flux 60 would escape around the sides of the mouse, as was seen in FIG. 2.

Figure 6B:
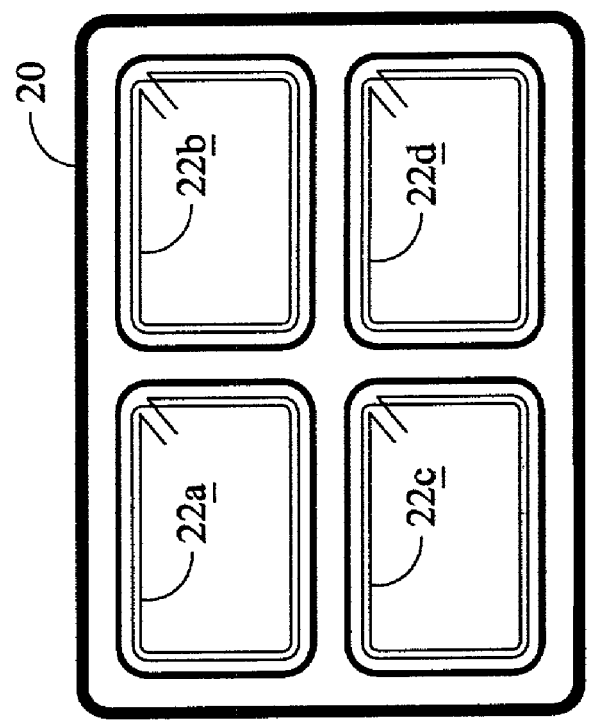
FIGS. 6A and 6B are top view diagrams showing example layouts of the source loop in relation to the mousepad for embodiments of the invention.
Figure 6A:
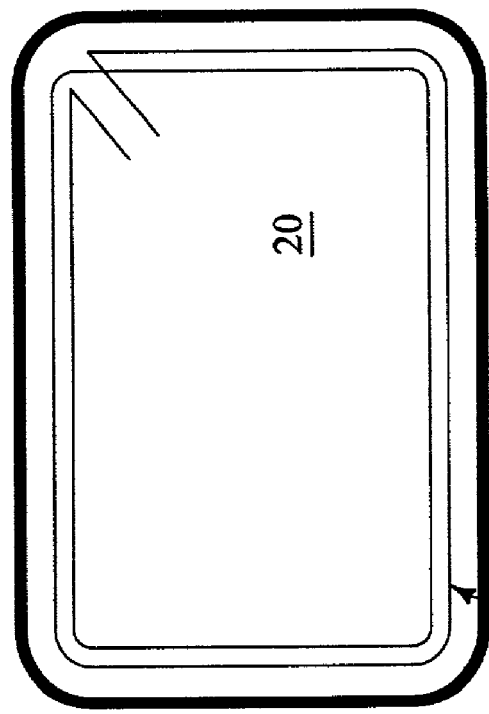

FIG. 6A shows one embodiment of layout of the source loop 22 in relation to the mousepad 20. In this embodiment, the source loop 22 is formed around the perimeter of the mousepad 20. Although in this figure the source loop 22 is shown in a generally rectangular shape, a more circular shape could also be used. The more circular shape would make a more uniform distribution of the magnetic flux lines 60 (not shown in FIG. 6A), but a larger portion of the mousepad 22, near the corners, would have areas of very little magnetic flux. In such a case, the surface of the mousepad 20 itself may have printing or some other indication of where the user should best place the mouse 30 to maximize the inductive power from the mousepad.

FIG. 6B shows another example of how the source loop 22 could be laid out in the mousepad 20. In this example, a number of separate source loops, 22A, 22B, 22C and 22D are used. If each of these separate source loops can generate as many magnetic flux lines 60 as the source loop 22 of FIG. 6A, then more magnetic flux is generated in this type of layout, which will result in a greater transfer of induced voltage in the mouse 30. In the example shown in FIG. 6B, the primary power circuit 122 (FIG. 4) would need to be modified to drive all of the source loops 22A–22D.

Figure 7:
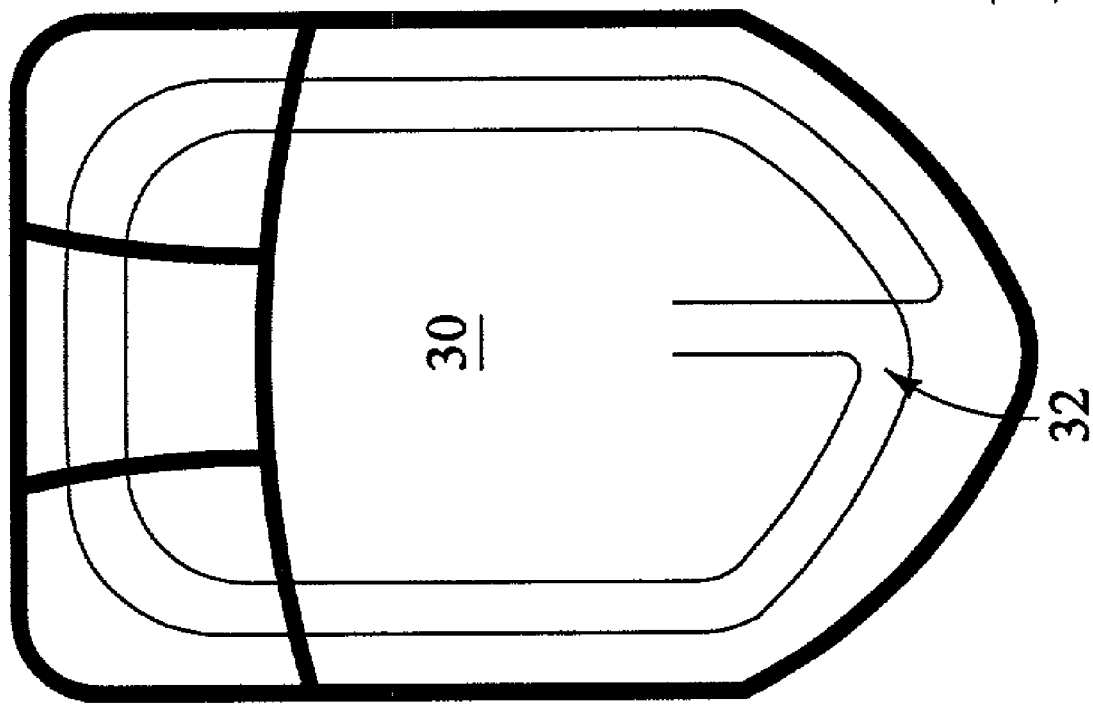
FIG. 7 is a top view diagram showing an example layout of the victim loop in relation to the mouse for embodiments of the invention.

FIG. 7 shows an example layout of the victim loop 32 within the mouse 30.

Similar to that of FIG. 6A, the victim loop in this embodiment is formed around the perimeter of the mouse 30, although nothing limits how the victim loop 32 can be situated within the mouse. For instance there may be an advantage to including multiple victim loops 32 arranged within the mouse, similar to the arrangement shown for the source loops 22A–22D in FIG. 6B. Generally, though, because it is likely that the mouse 30 will always be completely within the magnetic flux lines 60 generated by the mousepad 20, there should not be an advantage to making multiple victim loops 22 within the mouse 30.

Figure 8:
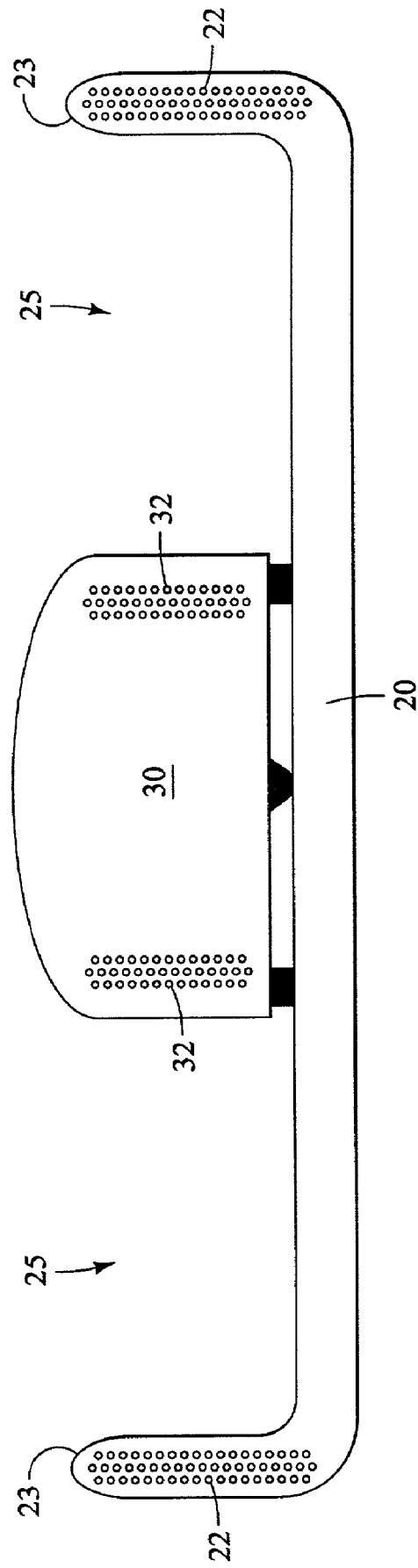
FIG. 8 is a cross sectional diagram of a mousepad showing a further example of an embodiment of the invention.

FIG. 8 shows an alternative embodiment for the inductive charging system. This figure shows how the source loops 22 and the victim loops 32 can be implemented on nearly the same plane as one another. In application, sides 23 of the mousepad 20 can be made to extend vertically to house the victim coils 22. This creates a depression area 25 near the center of the mousepad, in which the mouse 30 sits. In this configuration, the victim loops 32 are almost completely inside the source loops 22, which increases the effective ability to generate a voltage in the source loop 32. Although this embodiment shows the sides 23 extending many times the distance of the height of the depression area 25, the actual implementation may range from no increased side elevation, to one where the sides of the mousepad 20 extend beyond the height of the mouse 30 during normal operation. The actual implementation may be empirically determined, and consumer considerations may also be factored into the decision of how high to make the sides 23. One such consideration is the position of a user's hand required to hold the mouse 30 over the side 23 that is closest to the user. If the sides 23 are relatively high, this position may be uncomfortable for the user of the mouse 30.

Implementation of the inductive charging system is straightforward and intuitive once the details of the invention as described above are known. As always, implementation of the invention is left to the system designer. The mousepad may be implemented in any way, with any circuits, and from any material or combination of materials, as long as it is able to generate the magnetic flux lines to interact with the mouse. Indeed, although embodiments of the invention were described using an example of a mousepad, there is really no requirement that it be a mousepad at all. For instance, the circuitry necessary to generate the magnetic flux may simply be incorporated in a pad on which a standard mousepad rests. Or, the circuitry may be actually embedded into a desk or other support that is used to hold the mouse. Most likely, however, mousepads including the necessary circuitry will be the easiest to distribute to a user of the system.

Similarly, the mouse 30 can be implemented in any way, with any circuits, and from any material or combination of materials, as long as it is able to convert the magnetic flux lines sensed by the mouse into a signal able to recharge batteries within the mouse, or to drive the circuitry of the mouse directly.

Thus, although particular embodiments for an inductive recharging system for a peripheral device have been discussed, it is not intended that such specific references be considered as limitations upon the scope of this invention, but rather the scope is determined by the following claims and their equivalents.

What is claimed is:

1. A system for inductively transferring electrical power to a computer peripheral device during normal operation of the peripheral device, comprising:
   a base unit including:
      a source loop solenoid having an axis substantially perpendicular to a planar surface of the base unit to generate a magnetic field,
      a loop power circuit to provide a signal to drive the source loop, and
      a power source coupler structured to provide power to the loop power circuit when the power source coupler is coupled to a power source; and
   the peripheral device having a victim loop and structured to be inductively coupled to the base unit while the peripheral device is in operable condition;
   wherein the base unit comprises a first area and a second area, and wherein a level of magnetic permeability is higher in the first area than in the second area.

2. The power transfer system of claim 1 wherein the peripheral device is a computer mouse.

3. The power transfer system of claim 2 wherein the base unit is incorporated in a mousepad.

4. The power transfer system of claim 1, further comprising:
   a data transmitter coupled to the peripheral device, and
   a data receiver coupled to the base unit.

5. The power transfer system of claim 4, wherein the data transmitter sends a signal selected from the group consisting of radio frequency, infra-red, and ultrasonic.

6. The power transfer system of claim 4 wherein the data transmitter is structured to send wireless signals and the data receiver is structured to receive wireless signals.

7. The power transfer system of claim 1 wherein the victim loop is a coil of wire having a solenoid shape.

8. The power transfer system of claim 1 wherein the base further comprises one or more additional source loops.

9. The power transfer system of claim 1 wherein the peripheral device further includes:
    a rechargeable battery, and
    a recharging circuit coupled between the victim loop and the rechargeable battery.

10. The power transfer system of claim 1 wherein the peripheral device is additionally in operative condition when not inductively coupled to the base device.

11. A system for inductively transferring electrical power to a computer peripheral device during normal operation of the peripheral device comprising:
    a base unit including:
        a source loop solenoid having an axis substantially perpendicular to a planar surface of the base unit to generate a magnetic field,
        a loop power circuit to provide a signal to drive the source loop, and
        a power source coupler structured to provide power to the loop power circuit when the power source coupler is coupled to a power source; and
    the peripheral device having a victim loop and structured to be inductively coupled to the base unit while the peripheral device is in operable condition;
    wherein the peripheral device comprises a first area and a second area, and wherein a level of magnetic permeability is higher in the first area than in the second area.

12. The power transfer system of claim 11 wherein the peripheral device further comprises a data transmitter having an antenna formed in the first area.

13. A system for supplying power to a computer mouse, comprising:
    a base unit having a power signal input connectable to a power source, and having a non-planar magnetic source loop coupled to the power signal input, the source loop comprising an axis arranged substantially perpendicular to a planar surface of the base unit; and
    the computer mouse having a magnetic victim loop coupled to a load circuit within the mouse, wherein the computer mouse comprises a first urea and a second area, and wherein a level of magnetic permeability is higher in the first area than in the second area.

14. The system of claim 13, wherein, during a normal operating position of the computer mouse, the magnetic source loop and the magnetic victim loop are overlapped.

15. The system of claim 13, further comprising a rechargeable battery in the computer mouse, end wherein the load circuit is coupled to the rechargeable battery.

16. The system of claim 15, further comprising a docking cradle shaped to receive the computer mouse, the docking cradle having a battery recharging circuit.

17. The system of claim 13 wherein the load circuit is a wireless data transmitter.

18. The system of claim 13 wherein the power signal input is coupled to a serial bus, and, when the serial bus is powered, the base unit is structured to supply power from the serial bus to a source loop signal generator, which is coupled to the magnetic source loop.

19. The system of claim 18 wherein the source loop signal generator comprises an oscillator circuit.

20. The system of claim 19 wherein the oscillator circuit can generate a signal having a frequency at or above 60 cycles per second.

21. The system of claim 13 wherein the load circuit is structured to drive a mouse positional circuit within the computer mouse.

22. A method of powering a computer peripheral device having a victim loop coupled to circuitry of the peripheral device, the method comprising:
    accepting a power signal at a power input; and
    applying a source loop driving signal to a source loop solenoid while the source loop solenoid is proximate to the computer peripheral device;
    wherein the source loop solenoid has an axis substantially perpendicular to a planar surface over which the peripheral device is moved; and
    wherein the peripheral device comprises a first area and a second area, and wherein a level of magnetic permeability is higher in the first area than in the second area.

23. The method of claim 22 wherein the power signal is coupled to a bus on a personal computer.

24. The method of claim 22 wherein the power signal is the source loop driving signal.

25. The method of claim 22, further comprising rectifying the power signal to a source loop driving signal.

26. A method of recharging a rechargeable battery in a computer mouse that has a magnetic victim loop coupled to a battery recharging circuit, the method comprising:
    creating a magnetic field by driving a magnetic source loop solenoid with a magnetic source loop driving signal; and
    causing the magnetic field to interact with the magnetic victim loop in the computer mouse;
    wherein the magnetic source loop solenoid has an axis substantially perpendicular to a planar surface over which the computer mouse is moved;
    wherein the magnetic source loop solenoid is included in a base unit; and
    wherein the base unit comprises a first area and a second area, and wherein a level of magnetic permeability is higher in the first area than in the second area.

27. The method of claim 26, further comprising:
    accepting a power signal from a power source; and
    converting the power signal into the magnetic source loop driving signal.

28. The method of claim 27 wherein converting the power signal comprises generating an oscillating signal from the power signal using a pulse width modulation circuit.

29. The method of claim 27 wherein accepting a power signal from a power source comprises accepting a power signal from a computer bus.

* * * * *